US005677679A

United States Patent [19]

Iwanishi

[11] Patent Number: 5,677,679

[45] Date of Patent: Oct. 14, 1997

[54] SOUND DEVICE FOR MESSAGE DECODER

[75] Inventor: Masamitsu Iwanishi, Yokohama, Japan

[73] Assignee: Oi Electric, Ltd., Kanagawa, Japan

[21] Appl. No.: 426,038

[22] Filed: Apr. 21, 1995

[30] Foreign Application Priority Data

Aug. 29, 1994 [JP] Japan .................................... 6-203483

[51] Int. Cl.[6] ................................ G08B 7/00; H04B 1/38

[52] U.S. Cl. .................................. 340/815.69; 340/384.1; 340/384.73; 340/388.4; 340/396.1; 340/825.15; 340/825.44; 379/440; 455/90

[58] Field of Search ............................ 340/815.69, 384.1, 340/384.73, 388.1, 388.4, 391.1, 396.1, 311.1, 825.46, 825.44, 407.1, 825.15, 825.27; 379/67, 59, 56, 185, 440; 455/89, 90, 11.1

[56] References Cited

U.S. PATENT DOCUMENTS

| | | | |
|---|---|---|---|
| 4,413,253 | 11/1983 | Hofer et al. | 340/388 |
| 4,718,110 | 1/1988 | Schaefer | 455/90 |
| 4,719,322 | 1/1988 | Guzik et al. | 455/90 |
| 4,786,889 | 11/1988 | Hayasaka | 340/311.1 |
| 4,794,489 | 12/1988 | Brown | 455/90 |
| 4,931,765 | 6/1990 | Rollins et al. | 340/693 |
| 4,969,206 | 11/1990 | Desrochers | 455/89 |
| 5,218,188 | 6/1993 | Hanson | 235/375 |
| 5,229,744 | 7/1993 | Ogura | 340/311.1 |
| 5,287,084 | 2/1994 | Sone | 340/388.4 |
| 5,554,971 | 9/1996 | Foster et al. | 340/407.1 |

FOREIGN PATENT DOCUMENTS

| | | |
|---|---|---|
| 539684 | 5/1993 | Japan . |
| 539685 | 5/1993 | Japan . |
| 575798 | 10/1993 | Japan . |
| 590595 | 12/1993 | Japan . |
| 616997 | 3/1994 | Japan . |

*Primary Examiner*—Donnie L. Crosland
*Attorney, Agent, or Firm*—Loeb & Loeb LLP

[57] ABSTRACT

A sound device can be incorporated into a message decoder. The message decoder roughly comprises a decoder body 10, a front shield plate 20, a buzzer 22, an IC substrate 30 and an LCD 32, a back shield plate 40, an RF receiver 50, and a decoder outer lid 60. One surface of the buzzer 22 having a double-coated adhesive tape 24 is stuck on the front surface of the decoder body 10. Hooks 23*a*, 23*b*, 23*c* and 23*d* of the front shield plate 20 are engaged with the sides of the decoder body 10 so that a sleeve 26 of the front shield plate 20 may be engaged with a cut edge 16 of the decoder body 10, whereby the other surface of the double-coated adhesive tape 24 of the buzzer 22 is stuck on the back surface of the front shield plate 20. In consequence, when the buzzer 22 emits sound, the decoder body 10 and the front shield plate 20 play the role of a vibrating plate 20.

5 Claims, 1 Drawing Sheet

SOUND DEVICE FOR MESSAGE DECODER

BACKGROUND OF THE INVENTION

1. Field of the Invention

The present invention relates to a sound device for a message decoder, and more specifically, it relates to an improvement to a sound device which can be incorporated into a message decoder.

2. Description of the Related Art

A message decoder has a memory for storing data transmitted by radio, and the data stored in the memory of the message decoder can be sent to a personal computer by plugging the message decoder into a PCMCIA slot of the personal computer. Here, the sendable data are stock quotations, an exchange rate or the like. Each customer individually contracts with a data service company to pick up necessary data from a plurality of data lists.

As described above, the message decoder is plugged into the PCMCIA slot of the personal computer to send the stored data to the personal computer. However, when this message decoder is plugged into the slot, the message decoder body is covered with a shield case in order to prevent noise from the personal computer intruding into the message decoder and the emission of noise from the message decoder to the personal computer.

Such a type of message decoder is usually used only for data receiving, and so it is different from a pager (a portable receiver for an electric bell) and does not generally require a calling sound mechanism.

However, for example, in order to use the message decoder simultaneously as the pager, the sound mechanism is further required. On the other hand, the message decoder is covered with the shield case for the protection of the same from EMI. Therefore, there is a problem that the sound volume which can be released through the shield case is noticeably limited thereby.

SUMMARY OF THE INVENTION

The present invention is intended to solve the above-mentioned problem, and an object of the present invention is to provide a sound device which can be incorporated into a message decoder.

In order to solve the above-mentioned object, according to the present invention, there is provided a sound device for a message decoder in which a decoder body is covered with a shield case so as to store data transmitted by radio and to send the data to a personal computer when required, the sound device comprising a sound source attached to the surface of the shield case, the shield case constituting a part of a sound member.

In addition, the sound device of the above-mentioned message decoder is characterized by having a display which can display the content of the transmitted data.

According to the sound device of the message decoder regarding the present invention which is constituted as described above, a sound source is attached to the surface of the shield case, the shield case itself constituting a part of a sound member. Therefore, a good sound function can be obtained by the vibration of the shield case itself.

Moreover, the sound device of the message decoder according to present invention has the display which can display the content of the transmitted data, and the message decoder can also possess the function of a pager, for example. Thus, prior to sending the data to a personal computer, the content of the data can be confirmed.

DETAILED DESCRIPTION OF THE INVENTION

Figure 1:
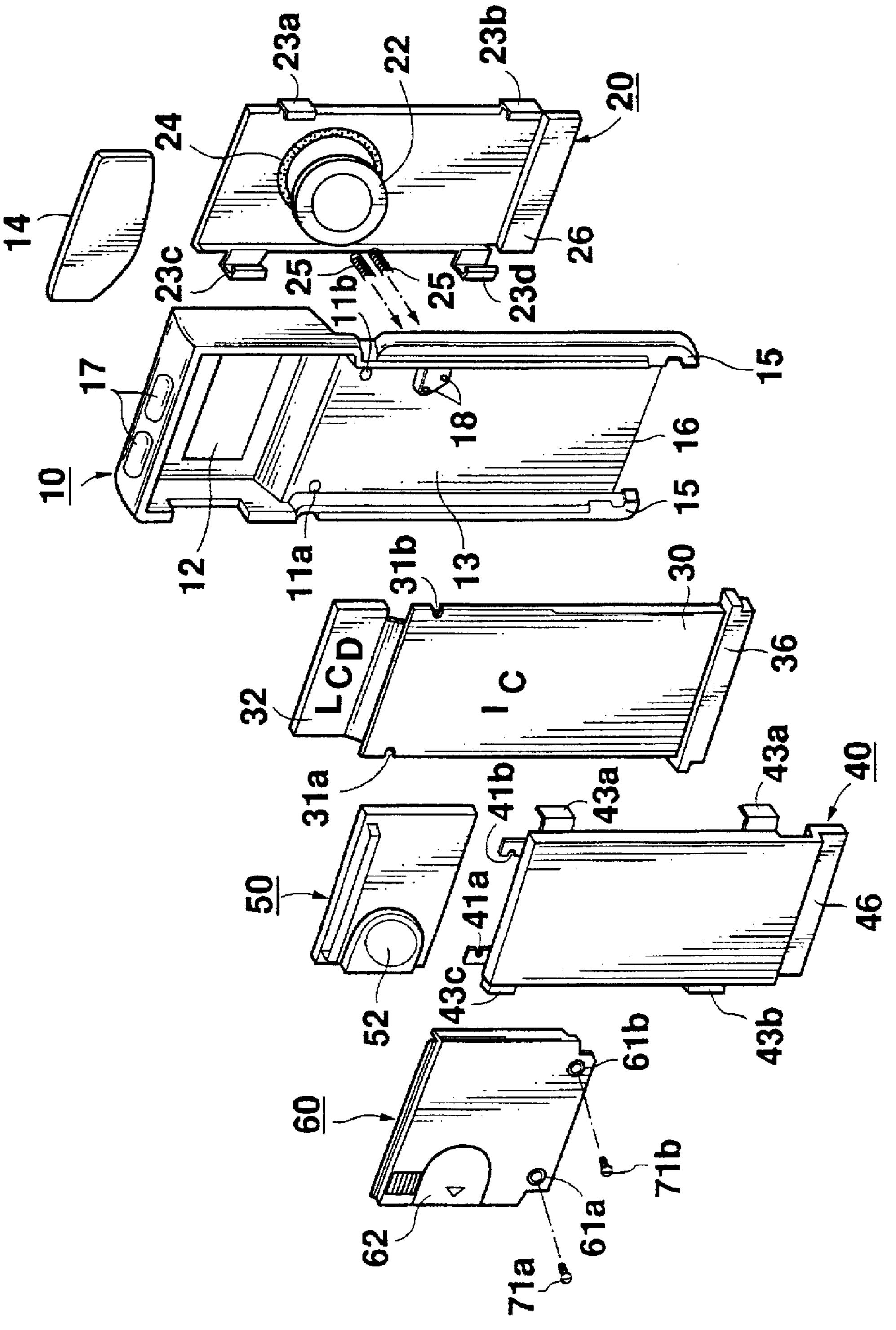
FIG. 1 is an exploded perspective view of a sound device for a message decoder regarding the present invention.

Now, a preferred embodiment of the present invention will be described in detail with reference to a drawing.

FIG. 1 is an exploded perspective view of a sound device for a message decoder according to present invention.

As shown in FIG. 1, the message decoder of this embodiment roughly comprises 7 parts. That is to say, the message decoder of this embodiment comprises a decoder body 10, a front shield plate 20, a buzzer 22, an IC substrate 30 and an LCD (a liquid crystal display) 32, a back shield plate 40, an RF receiver 50, and a decoder outer lid 60.

First, the constitution of each of these parts will be described.

A switch 17 is disposed on the upper surface of the decoder body 10, and a transparent plate 14 made of an acrylic resin plate is mounted on the front surface of the decoder body 10, whereby a display window 12 through which the LCD 32 is visible, is formed. The back surface of the decoder body 10 is provided with a support portion 13 for supporting the IC substrate 30 described below, holes 18 into which conductive terminals 25 are inserted, and holes **11*a*, 11*b* into which screws 71*a*, 71*b* described below can be screwed. Furthermore, on the bottom surface of the decoder body 10, a cut edge 16 is formed, both edges 15** being left.

The front shield plate 20 is provided on the sides thereof with hooks **23*a*, 23*b*, 23*c* and 23*d*, and on the lower portion of the front shield plate 20, a sleeve 26 is disposed which projects toward the back surface and which can be engaged with the cut edge 16 of the decoder body 10**.

On one surface of the buzzer 22 a double-coated adhesive tape 24 is fixed for attaching the buzzer 22 to the back surface of the front shield plate 20.

The IC substrate 30 is provided with a memory for storing, as digital signals, data transmitted by radio, and on the upper side surface of the IC substrate 30 screw holes **31*a*, 31*b* are formed, into which the screws 71*a*, 71*b* described below can be screwed. In addition, the upper portion of the IC substrate 30 is electrically connected to the LCD 32. The content of the data or the like transmitted by radio can be displayed by this LCD 32. The lower portion of the IC substrate 30 is inserted into a fixture 36, and this fixture 36 has a shape which permits the fixture 36 itself to be engaged with the edges 15** of the decoder body.

The back shield plate 40 is provided with hooks **43*a*, 43*b*, 43*c* and 43*d*, and on the lower portion of the back shield plate 40, a sleeve 46 is disposed which projects toward the back surface and which can be engaged with the cut edge 16 of the decoder body 10. Furthermore, on the upper side surface of the back shield plate 40 lugs having screw holes 41*a*, 41*b* are attacked into which the screws 71*a*, 71*b* described below are screwed. The RF receiver 50 is provided with an antenna for receiving radio signals, a tuner for tuning wavelength, an amplifier for amplifying the signals, a mixer, a detection circuit and the like. In addition, the RF receiver 50 is equipped with a cell 52** such as a lithium cell as a power source for driving the message decoder of this embodiment.

Moreover, the decoder outer lid 60 is attached to a cell lid 62 and further provided with screw holes **61*a*, 61*b* into which the screws 71*a*, 71*b*** are screwed.

Next, the assembly order of the message decoder of this embodiment will be described.

First, the conductive terminals 25 are inserted into the holes 18 of the decoder body 10. These conductive terminals 25 have a spring form. Next, the buzzer 22 is stuck on the back surface of the front shield plate 20 by virtue of the double-coated adhesive tape 24. The hooks 23*a*, 23*b*, 23*c* and 23*d* of the front shield plate 20 are engaged with the sides of the decoder body 10 so that the sleeve 26 of the front shield plate 20 may be engaged with the cut edge 16 of the decoder body 10. In consequence, the IC substrate 30 is electrically connected to the buzzer 22 by the conductive terminals 25, whereby electric current is fed from the cell 52 to the buzzer 22 through the IC substrate 30.

The feature of this embodiment resides in that the buzzer 22 is directly stuck to the decoder body 10 and the front shield plate 20. In this constitution, when the buzzer 22 emits sound, the front shield plate 20 also vibrates to play the role of a part of a sound member, i.e., a vibrating plate. In consequence, a good sound function can be obtained. In particular, if the vibration frequency of the buzzer 22 is combined with the resonance frequency of the front shield plate 20, the sound of the buzzer 22 can be outwardly released substantially without being attenuated. Accordingly, even if the buzzer 22 has a small size, sufficient sound volume can be secured. Even if both the frequencies deviate slightly from each other, sufficient sound volume can be obtained by sticking the buzzer 22 on the front shield plate 20 to utilize the front shield plate 20 as a part of the sound member.

Next, the IC substrate 30 is attached to the support portion 13 of the decoder body 10 so that the fixture 36 may be engaged with the edges 15 of the decoder body 10, whereby the LCD 32 is positioned, corresponding to the display window 12 of the decoder body 10. Furthermore, the transparent plate 14 is attached to the display window 12.

Afterwards, the hooks 43*a*, 43*b*, 43*c* and 43*d* of the back shield plate 40 are engaged with the sides of the decoder body 10, while the sleeve 46 of the back shield plate 40 is engaged with the cut edge 16 of the decoder body 10 so that the IC substrate 30 may be sandwiched between the decoder body 10 and the plate 40. Afterward, the RF receiver 50 is electrically connected to the IC substrate 30 and is then put on the LCD 32.

Finally, the decoder outer lid 60 is mounted on the RF receiver 50, and the screws 71*a*, 71*b* are inserted and screwed into the screw holes 61*a*, 61*b*, the screw holes 31*a*, 31*b*, the screw holes 41*a*, 41*b* and the holes 11*a*, 11*b* to integrally combine the respective parts.

Since the sleeve 26 of the front shield plate 20 and the sleeve 46 of the back shield plate 40 are engaged with the cut edge 16 of the decoder body 10, dust and the like can be prevented from getting into the message decoder.

Therefore, the message decoder of this embodiment has a sound mechanism for informing a user that the message decoder has received radio signals, and so it can also be used as a pager. Furthermore, the message decoder has an LCD for displaying the content of data transmitted by radio, and so it can also be used as the pager. In addition, it is also possible to confirm the content of the data prior to sending the data to a personal computer.

As described above, according to a sound device of a message decoder regarding the present invention, a sound source is attached to the surface of a shield case, whereby the shield case itself can constitute a part of a sound member. Therefore, a good sound function can be obtained by the vibration of the shield case itself. That is to say, when a speaker is merely incorporated as a sound mechanism into the message decoder, the sound volume which can be outwardly released is noticeably limited by the shield case, but according to the constitution of the present invention, the sound volume from a sound source is scarcely attenuated and so the sufficient sound volume can be obtained.

In addition, the sound device of the message decoder regarding the present invention has a display which can display the content of transmitted data, and therefore it is possible to confirm the content of the data prior to sending the data to a personal computer.

Thus, according to the present invention, the message decoder can also be used, for example, as a pager.

What is claimed is:

1. A sound device in combination with a message decoder, said message decoder comprising a decoder body covered with, and substantially fully enclosed by, a shield case which blocks electromagnetic radiation so as to store data transmitted by radio and to send the data to a personal computer when required, said sound device comprising a sound source attached to the surface of the shield case, the shield case constituting a part of a sound member.

2. The sound device in a message decoder according to claim 1 which further has a display which can display the content of the transmitted data.

3. The sound device in a message decoder according to claim 1 wherein the sound source is a buzzer attached to the surface of the shield case by a double-coated adhesive tape.

4. The sound device in a message decoder according to claim 1 wherein the decoder body is equipped with an IC substrate to which electric current is fed, and the sound source is electrically connected to the IC substrate via spring-like conductive terminals.

5. The sound device in a message decoder according to claim 1 wherein the vibration frequency of the sound source is substantially equal to the resonance frequency of the shield case.

* * * * *